United States Patent
Langenhop

[15] 3,664,485
[45] May 23, 1972

[54] INTER-CONVEYOR TURN DEVICE

[72] Inventor: John Herman Langenhop, York, Pa.
[73] Assignee: AMF Incorporated
[22] Filed: May 29, 1969
[21] Appl. No.: 828,829

[52] U.S. Cl. ................................................198/78, 198/28
[51] Int. Cl. ....................................B65g 47/52, B65g 37/00
[58] Field of Search ...................198/7, 7 BL, 28, 78, 80, 102

[56] References Cited

UNITED STATES PATENTS 1,531,711   3/1925   Marsh, Jr. ..................................198/78

FOREIGN PATENTS OR APPLICATIONS 708,914   5/1954   Great Britain ...........................198/28

1,003,360   10/1963   Great Britain ...........................198/28

Primary Examiner—Evon C. Blunk
Assistant Examiner—Alfred N. Goodman
Attorney—George W. Price and Barry H. Fishkin

[57] ABSTRACT

Materials handling apparatus which comprises a first conveyor belt, a second conveyor belt disposed to receive articles from said first conveyor belt, the direction of movement of said second belt being perpendicular to the first, and means mounted adjacent said conveyor belts for assisting articles around the ninety-degree turn from the first conveyor to the second conveyor.

1 Claim, 2 Drawing Figures

PATENTED MAY 23 1972

3,664,485

INVENTOR.
JOHN H. LANGENHOP
BY B H Fisher
ATTORNEY

INTER-CONVEYOR TURN DEVICE

BACKGROUND

This invention relates to materials handling and more particularly to the transportation of articles between and across angularly disposed conveyor interfaces.

In the field of materials handling, usage is often made of conveyor belts to transport articles from one point to another. Quite often the most convenient path for the articles between the originating and terminating points is not a straight line. In these instances more than one conveyor belt is utilized, with these conveyor belts being angularly disposed to one another. This angle is most often 90°. As the magnitude of materials handling systems increase, more conveyor belts are utilized and correspondingly more 90° interfaces are needed in the system. For example, in sorting and storing applications there are usually a large plurality of 90° interfaces.

When articles are transported between and over a 90° interface of two conveyor belts, the direction of movement of the two belts generally urges the packages toward the corner formed by the "forward" ends of the two belts. When this occurs in prior art systems, part or all of an article, depending on its size and shape, can come to rest in the "dead" area between the two conveyor belts, thereby causing stoppages or blockages in the material flow.

SUMMARY

It is, therefore, an object of this invention to provide apparatus for facilitating the transportation of articles between two conveyors angularly disposed to one another.

It is another object of this invention to provide apparatus to preclude articles from flowing into the "dead" space between two conveyors which are angularly disposed to each other.

In accordance with these and other objects, which will become apparent from the detailed description hereinbelow, apparatus according to the invention comprises means disposed adjacent two perpendicularly disposed conveyor belts for assisting articles around the 90° turn as they are moved from one conveyor belt to the other.

DESCRIPTION OF PREFERRED EMBODIMENT

Figure 1:
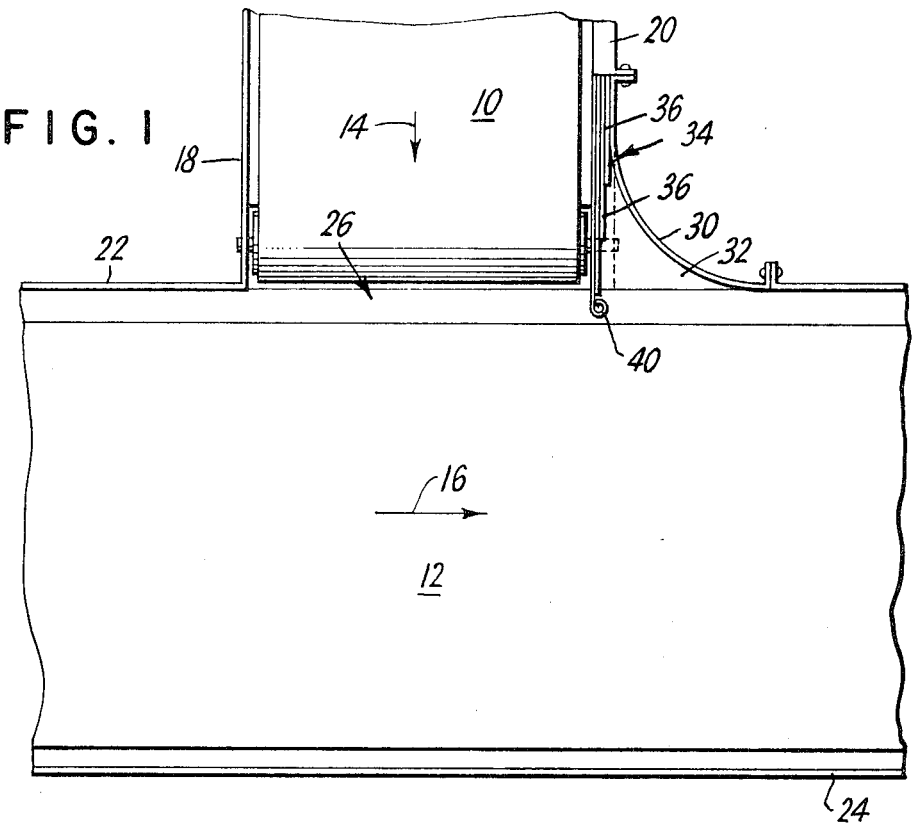
FIG. 1 is a plan view of the invention, shown in conjunction with two perpendicularly disposed conveyors.
Figure 2:
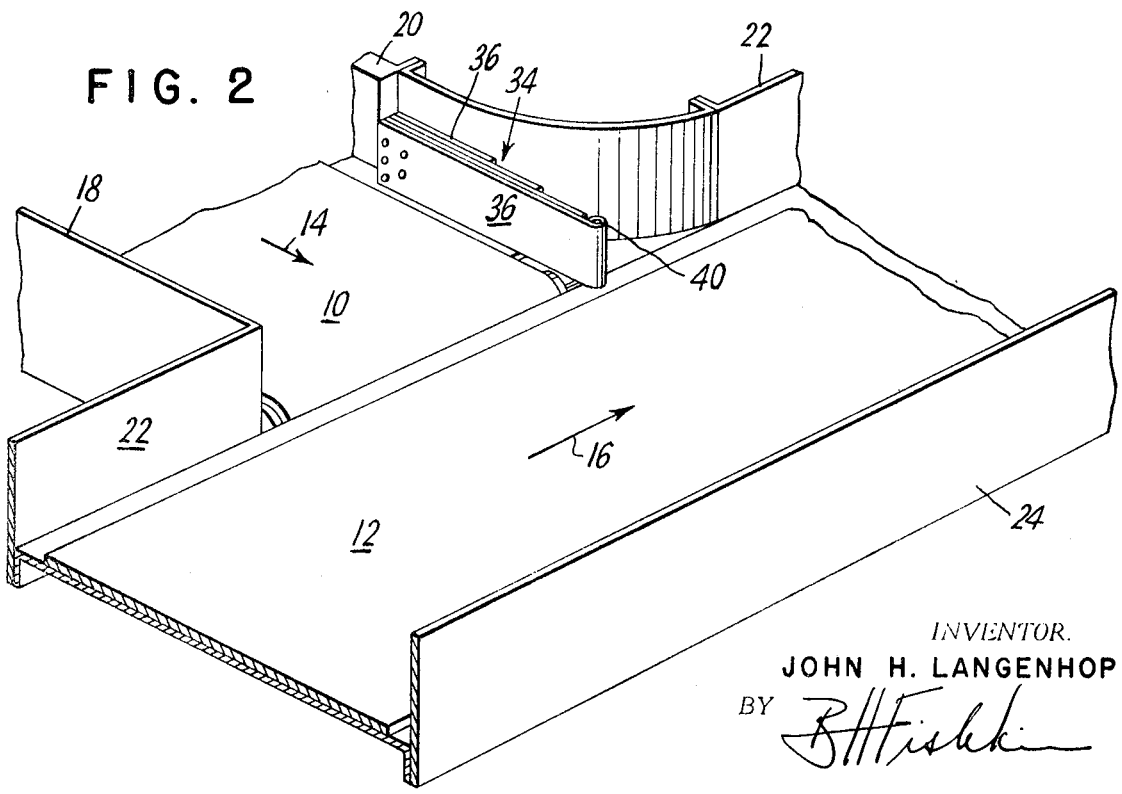
FIG. 2 is a perspective view of the invention shown in FIG. 1.

With reference to the drawings, a first conveyor 10 feeds articles into a second conveyor 12. Arrows 14 and 16 show the direction of travel of the conveyors 10 and 12 respectively. Since the two conveyors depicted in the drawings are adapted to transport articles, sidewalls are provided opposite the sides of the conveyor for retaining on the conveyors articles that may become unbalanced and topple over. Sidewalls 18 and 20 are provided at the sides of conveyor 10 and sidewalls 22 and 24 are provided at the sides of conveyor 12.

At the interface 26 of the two conveyors 10 and 12, the leading edges of articles tend to be drawn to the right as seen in the drawings by the action of conveyor 12 thereon. Thus, instead of being transported directly and in a rectilinear fashion around the corner from conveyor 10 on to conveyor 12, articles tend to be drawn "around a curve" by the action of the two conveyors. In view of this movement to the right it is common practice to provide a curved wall at the side of the interface 26 adjacent the direction of travel of conveyor 12. This sidewall is designated 30 in the drawings.

With this arrangement, the length of packages able to be handled by a system is substantially increased since long articles can be turned around the corner by the action of conveyors 10 and 12, the space between sidewall 30 and the two conveyors accommodating the middle of the package. This space, designated 32, is a "dead" space in that no movement is imparted to articles resting wholly or mostly therein. Therefore, should small or irregularly shaped articles or very light articles impinge upon dead space 32 they will remain there to form a blockage to articles following therebehind and/or become lost to the system.

To preclude this, the instant invention involves the provision of a spring means 34 mounted to sidewall 20 tangentially thereto. The spring means 34 comprises a plurality of leaf springs 36 mounted face to face by a plurality of bolts 38 which cantilever spring means 34 alongside conveyor 10. The thickness of leaf springs 36 is exaggerated in the drawings to more adequately depict the invention. The end 40 of the leaf spring adjacent conveyor 10 is formed cylindrically, for reasons described hereinbelow.

In operation, articles are transported down conveyor 10 whereupon they reach the portion of conveyor 12 adjacent thereto. When a sufficient portion of each article impinges on conveyor 12 so as to cause a frictional engagement therewith, the leading edge of the articles will be urged to the right by conveyor 12 as conveyor 10 urges the articles further onto conveyor 12. This results in a general curving movement of a differential increment of the article around the corner from conveyor 10 to conveyor 12.

This movement brings the side edge of the article into contact with spring means 34. If the article is of generally small mass, the strength of the spring will prevent the article from entering into the dead space 32 at all or, will deflect just slightly permitting only a small portion of the package to slide over the edge of the dead space. As the mass of articles increases, the action of the side of the article caused by movement of the conveyors will deflect the spring more, exposing more of dead space 32 to the bottom of the package. However, in almost every instance, an article sufficient mass to expose a significant portion of dead space 32 will be of sufficient size such that enough of its bottom surface will be on conveyors 10 and 12 to preclude a stoppage.

As the center of gravity of the article passes the cylindrical edge 40 of the spring means the "loaded" spring will then exert a force towards its normal position, "kicking" the rear end of the article to the left as seen in the drawings. This, taken with the movement of conveyor 12, moves the package around completely onto that conveyor.

The cylindrical portion 40 of the spring means adds mass to the end of the spring means to aid in the kicking force. Of course, rather than forming the end of the leaf spring adjacent conveyor 10 cylindrically, a separate cylindrical member could be welded thereon, or affixed thereto in a similar manner.

Having now fully set forth both structure and operation of a preferred embodiment of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

I claim:

1. Materials handing apparatus which comprises:
   a first conveyor belt,
   a second conveyor belt disposed perpendicularly to said first conveyor belt and operable to receive articles therefrom,
   sidewalls mounted opposite the sides of said first and second conveyor belts, said sidewalls extending substantially above the level of the conveyor belts,
   a curved wall mounted at the downstream corner of said conveyor belts, said curved wall being faired into the sidewalls adjacent thereto and forming a dead space between the conveyors and the curved wall, and a plurality of leaf springs for assisting articles around the turn between the first and second conveyors, the leaf springs being mounted to a sidewall of the first conveyor adjacent the curved wall in a cantilevered fashion and extending tangentially away therefrom between the first conveyor and the dead space to a position over a portion of the second conveyor, said leaf springs being mounted together face to face and being of different lengths, with the longest being mounted closest to the first conveyor and the others being mounted in back thereof in order of decreasing length.

* * * * *